US010829232B2

(12) United States Patent
Tantot

(10) Patent No.: US 10,829,232 B2
(45) Date of Patent: Nov. 10, 2020

(54) AIRCRAFT COMPRISING A PROPULSION ASSEMBLY INCLUDING A FAN ON THE REAR OF THE FUSELAGE

(71) Applicant: SAFRAN AIRCRAFT ENGINES, Paris (FR)

(72) Inventor: Nicolas Jerome Jean Tantot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 342 days.

(21) Appl. No.: 15/745,770

(22) PCT Filed: Jul. 21, 2016

(86) PCT No.: PCT/FR2016/051885
§ 371 (c)(1),
(2) Date: Jan. 18, 2018

(87) PCT Pub. No.: WO2017/013363
PCT Pub. Date: Jan. 26, 2017

(65) Prior Publication Data
US 2018/0208322 A1 Jul. 26, 2018

(30) Foreign Application Priority Data

Jul. 22, 2015 (FR) ...................................... 15 56952

(51) Int. Cl.
*B64D 27/20* (2006.01)
*B64D 33/04* (2006.01)
(Continued)

(52) U.S. Cl.
CPC ............. *B64D 27/20* (2013.01); *B64D 27/14* (2013.01); *B64D 27/26* (2013.01); *B64D 33/04* (2013.01);
(Continued)

(58) Field of Classification Search
CPC ........ B64D 33/04; B64D 35/06; B64D 27/14; B64D 27/20; B64D 27/26; F01D 13/003;
(Continued)

(56) References Cited

U.S. PATENT DOCUMENTS

| 3,033,492 | A | * | 5/1962 | Rowe | ...................... | F02K 1/002 |
| | | | | | | 244/23 R |
| 3,041,822 | A | * | 7/1962 | Embree | ..................... | F02K 1/17 |
| | | | | | | 60/242 |

(Continued)

FOREIGN PATENT DOCUMENTS

| EP | 1267064 | 12/2002 |
| FR | 1443200 | 6/1966 |
| FR | 2997681 | 5/2014 |

OTHER PUBLICATIONS

Applicant, "International Search Report," PCT Application No. PCT/FR2016/051885 (dated Nov. 16, 2016).

*Primary Examiner* — Claude J Brown
(74) *Attorney, Agent, or Firm* — Womble Bond Dickinson (US) LLP

(57) ABSTRACT

The present invention relates to an aircraft including a fuselage and a thruster downstream of the fuselage. The thruster includes a power turbine, located inside a main flow jet, and at least one fan, located inside a secondary flow jet and mechanically driven by the power turbine. The main flow jet of the power turbine and the secondary flow jet of the fan are concentric. The power turbine is supplied with gases from two gas turbine gas generators via two supply channels. The gas turbine gas generators have axes parallel to that of the fuselage. The air inlet sleeve is spaced apart from the fuselage, and the supply channels each have a hatch for controlling the flow between a position for guiding the (Continued)

gas flow to the power turbine and a position for ejecting the gases into the atmosphere while bypassing the power turbine.

13 Claims, 2 Drawing Sheets

(51) Int. Cl.

| | | |
|---|---|---|
| *B64D 35/06* | (2006.01) | |
| *F02K 3/062* | (2006.01) | |
| *B64D 27/14* | (2006.01) | |
| *F01D 13/00* | (2006.01) | |
| *B64D 27/26* | (2006.01) | |
| *F02C 6/02* | (2006.01) | |
| *F02K 3/02* | (2006.01) | |
| *F02K 3/072* | (2006.01) | |

(52) U.S. Cl.
CPC ........... *B64D 35/06* (2013.01); *F01D 13/003* (2013.01); *F02C 6/02* (2013.01); *F02K 3/025* (2013.01); *F02K 3/062* (2013.01); *F02K 3/072* (2013.01); *F05D 2220/323* (2013.01)

(58) Field of Classification Search
CPC . F02C 6/02; F02K 3/062; F02K 3/072; F02K 3/025
USPC .......................................................... 244/54
See application file for complete search history.

(56) References Cited

U.S. PATENT DOCUMENTS

| | | | |
|---|---|---|---|
| 3,060,685 A | 10/1962 | Tonnies et al. | |
| 3,099,425 A | 7/1963 | Fricke | |
| 3,286,470 A * | 11/1966 | Gerlaugh | F02K 1/56 60/229 |
| 3,366,350 A | 1/1968 | Hoffert et al. | |
| 3,442,082 A * | 5/1969 | Peterson | F02K 3/12 60/224 |
| 6,845,606 B2 * | 1/2005 | Franchet | F02K 3/025 60/225 |
| 7,395,988 B2 * | 7/2008 | Richardson | B64C 3/385 244/17.19 |
| 9,352,843 B2 * | 5/2016 | Suciu | F02K 3/06 |
| 2014/0301844 A1 * | 10/2014 | Vion | F01D 5/141 416/129 |
| 2015/0247455 A1 * | 9/2015 | Sheridan | F02K 3/12 60/772 |

* cited by examiner

AIRCRAFT COMPRISING A PROPULSION ASSEMBLY INCLUDING A FAN ON THE REAR OF THE FUSELAGE

FIELD OF THE INVENTION

The present invention relates to the field of aeronautics in which aircraft are propelled by a set of fan rotors disposed at the rear, in the extension of the fuselage. The fan rotors are driven by free, contra-rotating turbines supplied by gas generators formed by turbojet engines.

PRIOR ART

Patent application FR-A1-2997681 proposes a new aircraft architecture that allows noise pollution and aircraft fuel consumption to be reduced while limiting aerodynamic drag.

In such an architecture, an aircraft is propelled by a contra-rotating fan propulsion system integrated into the rear of the fuselage of the aircraft, in the extension thereof. The propulsion system comprises at least two gas generators that supply a power turbine having two contra-rotating rotors for driving two fan rotors, the fans being disposed downstream of the gas generators and being partly supplied by the boundary layer created near the fuselage of the aircraft. The gas generators are gas turbine engines incorporated into the fuselage and having distinct air intakes that each supply a gas generator. Said air intakes are disposed laterally relative to the fuselage of the aircraft, and absorb at least part of the boundary layer formed around the fuselage. The diameter of the nacelle surrounding the fan rotors is, according to this embodiment, substantially equal to that of the largest cross section of the fuselage of the aircraft. This nacelle incorporates the power turbine.

In such a solution, in the event of the failure of the part of the propulsion system that is made up of the contra-rotating turbine and the contra-rotating fans, it may not be possible to maintain the ability to generate thrust. For example, in the event of the destruction of the vanes of the contra-rotating turbine, the internal hot flow may be completely obstructed by debris. This would result in a complete loss of thrust and the probability of a surge in the gas generators due to the sudden variation in the flow cross section.

U.S. Pat. No. 3,366,350 also discloses an aircraft that is equipped with a fan supplied by the gases from two gas generators in the event of damage to the fan. The fan is disposed in a casing that is arranged separately at the rear of the fuselage. The two gas generators are each installed in a fairing, at least part of which is integrated in the casing of the fan. The two gas generators each supply a portion of the turbine blades located on the periphery of the fan.

Furthermore, the method for installing gas generators that are fully integrated in the fuselage requires an air intake arrangement that allows the generators not to be supplied with the boundary layer created on the aircraft fuselage; since the speed of said boundary layer is substantially less than the flight speed, it is detrimental to the thermal efficiency of the gas generators.

The object of the present invention is to provide a solution that is suitable for the aforementioned type of aircraft architecture and propulsive unit to allow the assembly to operate optimally, regardless of the various flight conditions.

Therefore, more specifically, one aim is to supply the gas generators without ingesting the fuselage boundary layer or distorting the flow, so as to maximise the generators' thermal efficiency. It also involves maintaining the ability to supply the propulsive unit with the maximum amount of air from the boundary layer in order to maximise the unit's propulsive efficiency.

A further aim of the present invention is to maintain a thrust capability in the event of a major failure of the propulsive module.

A further aim of the present invention is to segregate the flows between the operational parts of the propulsive system and the parts that are no longer operational, in the event of the failure of the propulsive unit.

A further aim of the present invention is to install the gas generators in a manner that complies with the certification requirements, particularly in terms of "cross-debris" risks. This term relates to damage to one of the gas generators by debris originating from the other generator.

DISCLOSURE OF THE INVENTION

These aims are achieved by an aircraft comprising a fuselage and a propulsive unit downstream of the fuselage, the propulsive unit comprising a power turbine within a primary flow duct and at least one fan that is located within a secondary flow duct and is mechanically driven by the power turbine, the primary flow duct and the secondary flow duct being concentric, the power turbine being supplied with gases from at least two gas turbine gas generators via two supply channels, said gas turbine generators having axes that are parallel to that of the fuselage and spaced apart from the fuselage, and the supply channels each having a flow-control hatch that can move between a position for guiding the gas flow towards the power turbine and a position for discharging the gases from the gas generator into the atmosphere while bypassing the power turbine, the power turbine comprising two coaxial and contra-rotating rotors, each driving a contra-rotating fan rotor, and the two supply channels converging upstream of the power turbine into a single intake conduit.

This solution ensures that the gas generators are positioned far enough away from the fuselage so that their air intake ducts are spaced apart from the fuselage and do not ingest this boundary layer, which is detrimental to the thermal efficiency of the turbine engine, and particularly to the propulsive efficiency. Furthermore, the arrangement proposed by the invention either side of the fuselage relative to its longitudinal axis limits the "cross-debris" risk.

This configuration also allows the hot gas flows from the two gas generators to mix, which occurs upstream of the power turbine before supplying the power turbine. This prior mixing is a factor for homogenising the circumference of the flow to allow the power turbine to operate in aerodynamic conditions that are similar to those of conventional turbines. This therefore allows the efficiency and the lifetime of the power turbine to be improved.

It should be noted that this solution differs from that disclosed in patent EP 1267064 in the name of the present applicant, which relates to an engine that has a variable configuration and nominally alternates between subsonic and supersonic operation, the aim of the invention being to provide a remedial device in the event of a malfunction in the main propulsive unit located in the tail cone of the airplane. The architecture of a supersonic aircraft is not initially affected by a problem of optimising the efficiency of the gas generators in terms of the ingestion of the ingested boundary layer that is created on the fuselage. In particular, the basic purpose of the architecture of this turbine engine is to make it possible to vary the overall dilution rate of the engine power by activating, during the cruising flight phases, an auxiliary fan which is driven by a turbine supplied in part by the gases discharged by the two gas generators. Such a design is in no way connected to the notion of boundary layer ingestion on an aircraft. It also does not allow the hot gases to be homogenised before supplying the turbine.

Preferably, at least two gas generators are spaced apart from any of the wings of the aircraft.

In particular, the gas generators are respectively mounted on the fuselage by means of struts that create a space between a wall of the fuselage and the air intake duct of each of the gas generators, such that their air intake ducts do not ingest the boundary layer.

Even more preferably, the two gas generators are concealed from each other by the fuselage of the aircraft.

In this case, the "cross debris" risk is further reduced due to the presence of the fuselage between the two gas generators.

According to another feature of the invention, the average radius of the power turbine is less than the average radius of the fan.

According to another feature of the invention, the intake conduit upstream of the power turbine has a circular cross section. Such a configuration also allows a circumferential and homogenous supply for the power turbine over 360°. In particular, it helps to improve the efficiency of the power turbine.

Advantageously, the supply channels comprise discharging means for discharging gases into the atmosphere, which discharging means form wall elements of said supply channels when the hatches are positioned to guide the gas flows towards the power turbine.

Indeed, the propulsion of the aircraft is optimised to operate the propulsive unit downstream of the gas generators. Their integration into the wall of the supply channels allows any disruptions in the external flow to be minimised during this operation.

More specifically, the hatch for controlling the air flow from each gas generator comprises a wall element that can move between a position for blocking the supply channel and opening the discharge of the flow in parallel with the axis of the fuselage, and a position for guiding the flow into the supply channel.

Advantageously, the gas generators are mono-flow turbojet engines and, more specifically, the turbojet engines are two-spool turbojet engines.

In particular, the discharge channel from the turbojet engines is convergent. Therefore, in the invention, hot gases are discharged in the event of the malfunction of the main propulsive unit (considered to be an emergency mode) through a grid of the thrust inverter type, the free cross-section of which is rendered slightly convergent, thus acting as a simplified exhaust nozzle and generating thrust along the axis of the aircraft.

In particular, in the event of the complete failure of the two fan rotors, the gas generators continue to generate thrust in degraded mode by discharging through an exhaust nozzle.

DESCRIPTION OF THE DRAWINGS

The invention will be better understood, and further aims, details, features and advantages thereof will become clearer upon reading the following detailed description of an embodiment of the invention, which is provided strictly by way of an illustrative and non-limiting example, with reference to the accompanying schematic drawings, in which.

DETAILED DESCRIPTION OF AN EMBODIMENT OF THE INVENTION

Figure 1:
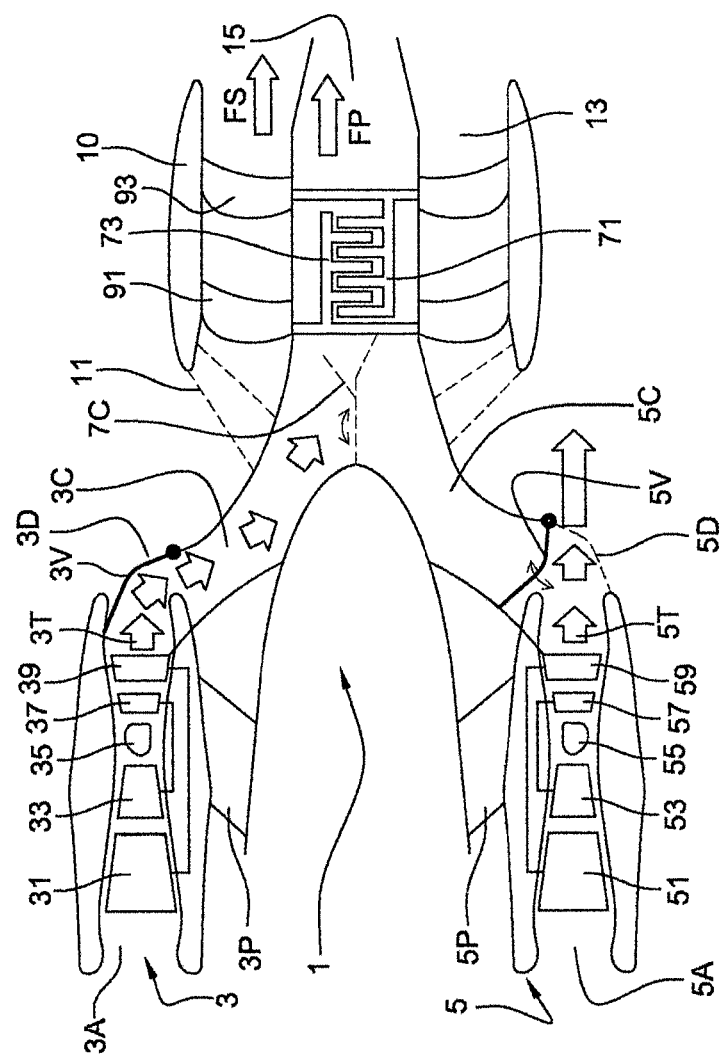
FIG. 1 is a schematic representation of a propulsive assembly according to the invention, the upper half showing the hatch in the normal engine operating position, the lower half showing the hatch in the position blocking the turbine supply channel.
Figure 2:
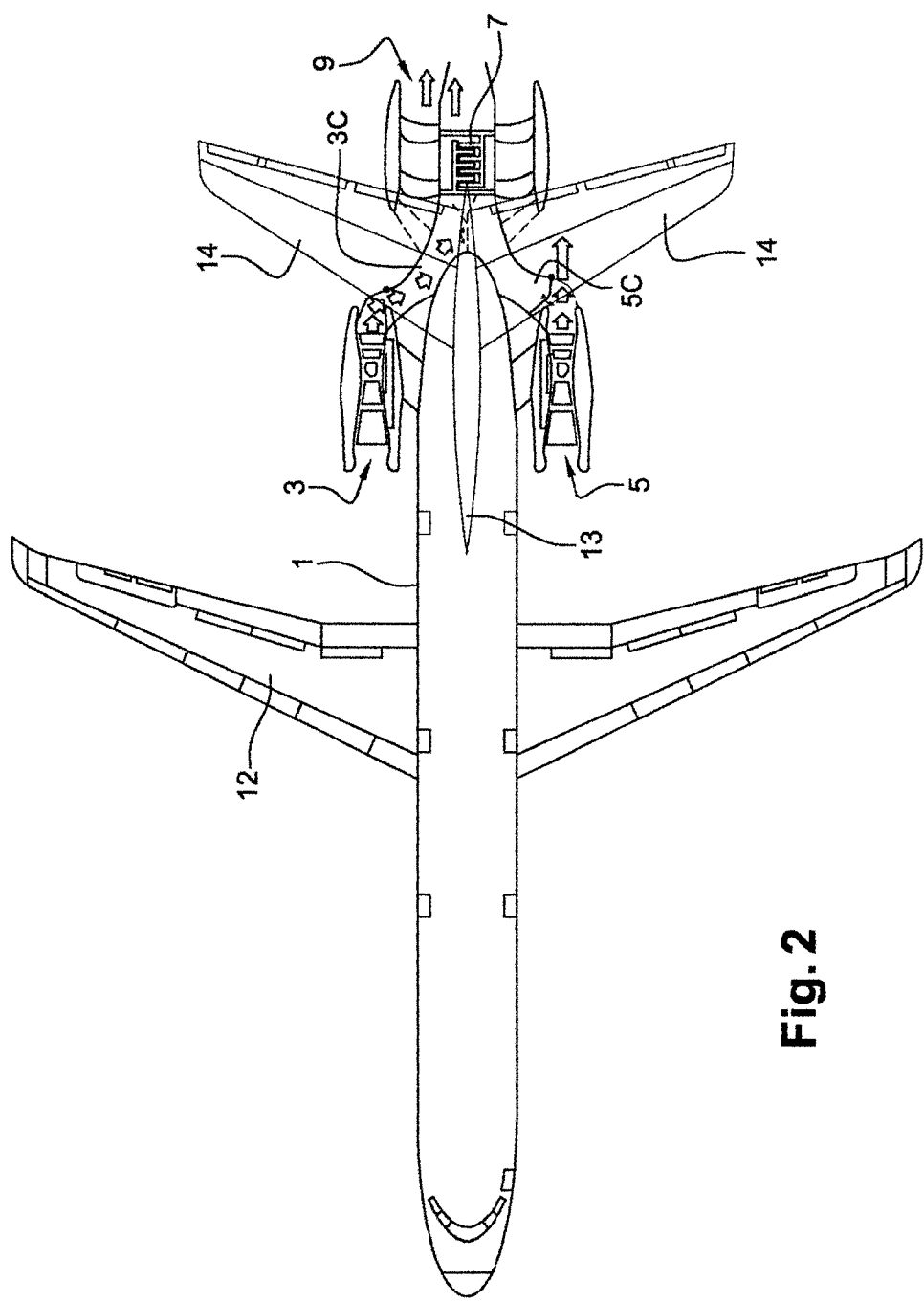
FIG. 2 shows the installation of the propulsive assembly of FIG. 1 on an aircraft according to the invention.

With reference to FIGS. 1 and 2, the propulsive assembly is mounted at the rear of the aircraft, on the rear part of the fuselage 1. The two gas generators 3 and 5 are mounted on this fuselage along respective axes parallel to that of the fuselage. Each gas generator 3, 5 is mounted on the fuselage so as to have a space between the fuselage and the other gas generator. This space makes it possible to prevent the ingestion of air from the boundary layer formed along the wall of the fuselage. Each gas generator 3, 5 comprises an air intake duct. In this example, each gas generator 3, 5 is respectively mounted on the fuselage by means of struts $3p$ and $5p$. These two struts allow sufficient space to be maintained between the wall of the fuselage and the air intake duct of each of the engines, $3a$ and $5a$, thus preventing the air from the boundary layer from being directed towards the air intake ducts of the gas generators, whilst supplying the fans 91 and 93 of the propulsive unit.

As can be seen in FIG. 2, the position of the struts $3p$ and $5p$ (in this case laterally at the rear of the fuselage 1) separates the generators 3 and 5 both from the wings 12, located substantially in the middle part of the fuselage, and the tail unit, in this case formed as a vertical fin 13 supporting two ailerons 14. More specifically, the gas generators are disposed laterally at the level of the fuselage and the ailerons are disposed at a vertical distance from the fuselage. Furthermore, the two generators 3, 5 in this case are installed upstream of the tail of the fuselage 1, in a region where the diameter of the fuselage allows the fuselage to conceal each generator from the other and the ailerons are at a distance from the gas generator turbines to prevent rupture of the turbine disc from damaging the other gas generator or the ailerons.

In the example shown here, the gas generators are mono-flow, two-spool turbojet engines. They therefore comprise a low-pressure spool formed by a rotor having a compressor 31, 51, and a turbine 39, 59, and a high-pressure rotor formed by a compressor 33, 53 and a turbine 37, 57. The compressors supply a combustion chamber 35, 55 with air, the gases produced from the combustion chamber driving the high-pressure and low-pressure turbines one after the other. The gases are guided towards the exhaust channels 3T and 5T immediately downstream of the turbines. These channels are extended by conduits 3C and 5C that converge towards a single intake conduit 7C of the propulsive unit, said conduit being located downstream of the fuselage.

The sufficient space between the axis of the fuselage and the axis of the gas generator can be between 0.5 and 1.5 times the diameter of the compressor.

The propulsive unit comprises a power turbine 7 located in the axis of rotation of the propulsive unit or in the vicinity thereof. As can be seen in FIGS. 1 and 2, the axis of rotation of the propulsive unit is substantially coaxial with the axis of the fuselage. The power turbine 7 is formed by two coaxial and contra-rotating turbine rotors, 71 and 73, in the axis of the fuselage. The gas flow duct driving the contra-rotating turbine forms the primary flow duct. Each turbine rotor is mechanically rigidly connected to a concentric external fan rotor, 91, 93, respectively. The contra-rotating fan 9 rotates inside the fan casing 10, which is connected to the fuselage 1 by arms 11 and which defines the secondary flow duct.

Hatches 3V and 5V are disposed downstream of the exhaust channels 3T and 5T of the two gas generators 3 and 5. They can pivot about an axis located downstream relative to the respective exhaust channel. These hatches form elements of the wall for guiding the gas flow from the exhaust channel 3T and 5T. In other words, these hatches form elements of the wall of the supply channels 3C, 5C.

During normal operation, the gases from the exhaust channels are guided in the supply conduits 3C and 5C of the propulsive unit. The two flows converge towards the single intake conduit of the propulsive unit. As can be seen in FIG. 1, the intake conduit is arranged downstream of the fans. In particular, the intake conduit 7 is located upstream of the power turbine 7. The hot gas flows are mixed upstream of the power turbine, which allows the flow to be homogenised over the entire power turbine for the supply thereof. The intake conduit 7 has a circular cross section that also contributes to a homogeneous supply for the turbine rotors. The flows form the primary flow that rotates the contra-rotating turbine 7 before being discharged into the atmosphere through the primary flow nozzle 15. The two turbine rotors 71 and 73 rotate each of the two rotors 91, 93 of the contra-rotating fan 9. These rotors suck the outside air into the volume defined by the fan housing and the fairing of the primary duct. The air passing through the fan forms the secondary flow.

Furthermore, during normal operation, each hatch 3V, 5V is positioned so as to be integrated into the extension of the wall, between the exhaust channel 3T, 5T and the intake channel 3C, 5C. In this way, the flow outside the aircraft and the gas generators is disrupted as little as possible.

When a malfunction occurs in the propulsive unit that may block the primary flow duct, which would cause a complete loss of thrust, the arrangement of the invention makes it possible for the aircraft thrust to be provided directly by the gases from the gas generators 3 and 5. The hatches 3V and 5V are pivoted about their axis of rotation so as to block the channels towards the supply conduits 3C and 5C of the propulsive unit. By pivoting, the hatches 3V and 5V reveal a part 3D, 5D of the wall in the axis of the associated exhaust channel 3T and 5T, thus forming a means for discharging the gases from each gas generator into the atmosphere. Therefore, the continuation of the thrust is guaranteed.

The invention claimed is:

1. Aircraft comprising a fuselage and a propulsive unit downstream of the fuselage, the propulsive unit comprising a power turbine within a primary flow duct and at least one fan that is located within a secondary flow duct and is mechanically driven by the power turbine, the primary flow duct of the power turbine and the secondary flow duct of the fan being concentric, the power turbine being supplied with gases from at least two gas turbine gas generators via at least two supply channels, said gas turbine generators having axes that are parallel to that of the fuselage and are spaced apart from the fuselage, and the supply channels each having a hatch for controlling the flow between a position for guiding the gas flow towards the power turbine and a position for discharging the gases into the atmosphere while bypassing the power turbine, characterised in that the power turbine (7) comprises two coaxial and contra-rotating rotors, each driving a contra-rotating fan rotor, and in that the two supply channels converge upstream of the power turbine into a single intake conduit.

2. Aircraft according to claim 1, wherein said gas turbine generators are respectively mounted on the fuselage by means of struts that create a space between a wall of the fuselage and the air intake duct of each of the gas turbine generators.

3. Aircraft according to claim 1, wherein the two gas turbine generators are spaced apart from any of the wings of the aircraft.

4. Aircraft according to claim 1, wherein the two gas turbine generators are concealed from each other by the fuselage of the aircraft.

5. Aircraft according to claim 1, wherein the supply channels comprise discharging means for discharging the gases into the atmosphere, which means form wall elements of said discharge channels when the hatches are positioned to guide the gas flow towards the power turbine.

6. Aircraft according to claim 5, wherein the hatch for controlling the flow comprises a movable wall element that can move between a position for blocking the supply channel and opening the discharge of the flow in parallel with the axis of the fuselage, and a position for guiding the flow into the supply channel.

7. Aircraft according to claim 1, wherein the gas turbine generators are mono-flow turbojet engines.

8. Aircraft according to claim 7, wherein the turbojet engines are two-spool turbojet engines.

9. Aircraft according to claim 8, wherein the supply channel from the turbojet engines is convergent.

10. Aircraft according to claim 1, wherein the single intake conduit is arranged upstream the fans.

11. Aircraft according to claim 1, wherein the intake conduit upstream the power turbine has a circular cross-section.

12. Aircraft according to claim 1, wherein the propulsive unit is coaxial with the axis of the fuselage and is arranged in the extension of the fuselage.

13. Aircraft according to claim 1, wherein the power turbine is situated along the axis of the fuselage.

* * * * *